US012604139B2

(12) United States Patent
Robison et al.

(10) Patent No.: US 12,604,139 B2
(45) Date of Patent: Apr. 14, 2026

(54) ADAPTIVE RESONANCE-CONTROLLED AUDIO SYSTEMS AND METHODS

(71) Applicant: Apple Inc., Cupertino, CA (US)

(72) Inventors: David W. Robison, San Jose, CA (US); Charles C. Hoyt, Pacifica, CA (US); Justin D. Crosby, Cupertino, CA (US); Teemu P. Sipila, Campbell, CA (US); Thomas M. Jensen, San Francisco, CA (US); Bryce D. Wolfson, San Jose, CA (US); Kevin M. Lynch, Woodside, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 18/136,862

(22) Filed: Apr. 19, 2023

(65) Prior Publication Data

US 2023/0379625 A1 Nov. 23, 2023

Related U.S. Application Data

(60) Provisional application No. 63/344,526, filed on May 20, 2022.

(51) Int. Cl.
*H04R 3/04* (2006.01)

(52) U.S. Cl.
CPC .................................... *H04R 3/04* (2013.01)

(58) Field of Classification Search
CPC ........ H04R 3/04; H04R 3/007; H04R 29/001; H04R 29/002; H04R 29/003; H04R 3/00; H04R 2440/00; H03G 5/00
USPC .............................................. 381/59, 96, 98
See application file for complete search history.

(56) References Cited

U.S. PATENT DOCUMENTS

| | | | | |
|---|---|---|---|---|
| 7,965,850 | B2 * | 6/2011 | Higashihara | H04R 29/007 381/59 |
| 10,601,970 | B2 | 3/2020 | Gillmore | |
| 10,791,406 | B2 | 9/2020 | Sun | |
| 11,927,992 | B2 | 3/2024 | Kim | |
| 12,003,929 | B1 | 6/2024 | Zhong | |
| 2013/0142360 | A1 | 6/2013 | Potard | |
| 2015/0163572 | A1 | 6/2015 | Weiss | |
| 2015/0319534 | A1 | 11/2015 | Lippert | |
| 2015/0326959 | A1 | 11/2015 | Zadesky | |

(Continued)

OTHER PUBLICATIONS

Indian Patent Application No. 202314032167; Office Action dated Sep. 25, 2025, 8 pages with English translation.

*Primary Examiner* — Xu Mei
(74) *Attorney, Agent, or Firm* — BAKERHOSTETLER

(57) ABSTRACT

Aspects of the subject technology relate to electronic devices having speakers. An electronic device may operate the speaker to generate audio output at one or more resonance frequencies of the speaker and/or the electronic device. This can allow the electronic device to generate particularly loud audio outputs while reducing the power consumption used to generate those audio outputs. In order, for example, to help ensure that the audio output is generated at the resonance frequencies, the electronic device can determine the resonance frequencies prior to generating the audio outputs. For example, the electronic device may determine resonance frequencies by obtaining one or more electrical characteristics of an electronic component while operating the speaker, and determine the resonance frequencies based on the obtained electrical characteristics.

21 Claims, 9 Drawing Sheets

(56) References Cited

U.S. PATENT DOCUMENTS

| | | | | |
|---|---|---|---|---|
| 2016/0100252 | A1* | 4/2016 | Pattok | H04R 29/001 381/59 |
| 2018/0255412 | A1 | 9/2018 | Ouyang | |
| 2020/0037069 | A1* | 1/2020 | Park | H04R 3/007 |
| 2020/0162818 | A1* | 5/2020 | Polleros | H04R 1/2826 |
| 2020/0404423 | A1 | 12/2020 | Dusan et al. | |
| 2022/0158070 | A1* | 5/2022 | Lesso | H04R 3/04 |

* cited by examiner

ADAPTIVE RESONANCE-CONTROLLED AUDIO SYSTEMS AND METHODS

CROSS REFERENCE TO RELATED APPLICATIONS

This application claims the benefit of priority to U.S. Provisional Patent Application No. 63/344,526, entitled, "Adaptive Resonance-Controlled Audio Systems And Methods", filed on May 20, 2022, the disclosure of which is hereby incorporated herein in its entirety.

TECHNICAL FIELD

The present description relates generally to electronic devices, including, for example, adaptive resonance-controlled audio systems and methods.

BACKGROUND

Electronic devices such as computers, media players, cellular telephones, wearable devices, and headphones are often provided with speakers for generating audio output from the device and microphones for receiving audio input to the device. However, as devices are implemented in ever smaller form factors, it can be challenging to integrate speakers into electronic devices, particularly in compact devices such as portable electronic devices. During use, a speaker can become occluded by water or other debris.

BRIEF DESCRIPTION OF THE DRAWINGS

Certain features of the subject technology are set forth in the appended claims. However, for purpose of explanation, several aspects of the subject technology are set forth in the following figures.

DETAILED DESCRIPTION

Figure 1:
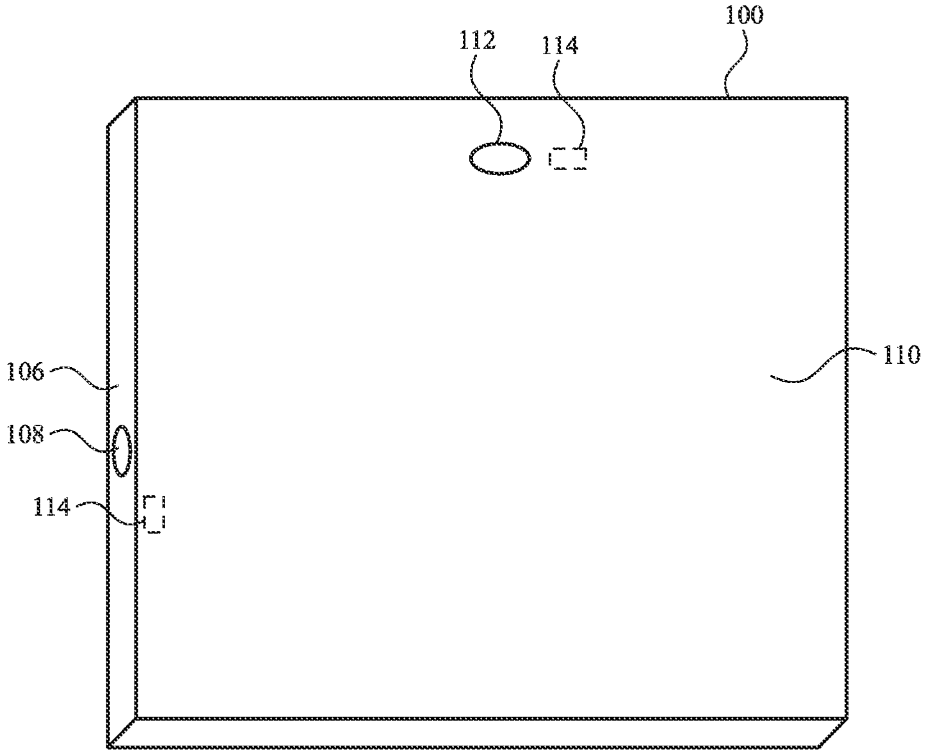
FIG. 1 illustrates a perspective view of an example electronic device having a speaker in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, tablet computers, laptop computers, wearable devices such as smart watches, headphones, earbuds, other wearable devices, and the like, often include one or more audio transducers such as a microphone for receiving sound input, or a speaker for generating sound. However, challenges can arise in implementing speakers into compact electronic devices in which space and/or power may be limited.

Aspects of the subject technology can provide an audio output of enhanced loudness from a speaker, such as a compact speaker implemented in an electronic device such as a compact electronic device (e.g., a wearable electronic device, such as a smart watch). In order, for example, to provide the enhanced loudness, the content of the audio output from a speaker of an electronic device may be generated and/or modified to occur at one or more resonant peaks of the speaker and/or the electronic device.

In accordance with aspects of the subject disclosure, to help ensure that the audio output of a speaker occurs at a resonant peak of the speaker, the resonant peaks of the speaker can be determined, in real time, based on measured electrical characteristics (e.g., an impedance, a resistance, a current, or the like) of a component of the electronic device (e.g., the voice coil of the speaker). In use, the electronic device may obtain electrical characteristic(s) of a component, determine the location of one or more resonant peaks of a speaker based on the electrical characteristic(s), and generate audio output(s) at the determined resonant peak(s).

This can be useful, for example, in an emergency situation in which the audio output is used as an alert (e.g., an emergency alert) of the location of the electronic device and/or a wearer thereof. Generating audio outputs at the resonant peaks can enhance the range at which the audio outputs can be heard. Generating audio outputs at the resonant peaks can also enhance the power efficiency of the speaker operations, thereby extending the time period over which emergency audio outputs can be generated. In accordance with one or more implementations, the electronic device may be provided with a model that can be fit to the measured electrical characteristics of the component of the electronic device, and from which the locations of the one or more resonant peaks can be obtained.

An illustrative electronic device including a speaker is shown in FIG. 1. In the example of FIG. 1, electronic device 100 has been implemented using a housing that is sufficiently small to be portable and carried or worn by a user (e.g., electronic device 100 of FIG. 1 may be a handheld electronic device such as a tablet computer or a cellular telephone or smart phone or a wearable device such as a smart watch, a pendant device, a headlamp device, or the link). In the example of FIG. 1, electronic device 100 includes a display such as display 110 mounted on the front of a housing 106. Electronic device 100 may include one or more input/output devices such as a touch screen incorporated into display 110, a button, a switch, a dial, a crown, and/or other input output components disposed on or behind display 110 or on or behind other portions of housing 106. Display 110 and/or housing 106 may include one or more openings to accommodate a button, a speaker, a light source, or a camera (as examples).

In the example of FIG. 1, housing 106 includes an opening 108. For example, opening 108 may form a port for an audio component. In the example of FIG. 1, the opening 108 forms a speaker port for a speaker 114 disposed within the housing 106. In this example, the speaker 114 is offset from the opening 108, and sound from the speaker may be routed to and through the opening 108 by one or more internal device structures (as discussed in further detail hereinafter).

In the example of FIG. 1, display 110 also includes an opening 112. For example, opening 112 may form a port for an audio component. In the example of FIG. 1, the opening 112 forms a speaker port for a speaker 114 disposed within the housing 106 and behind a portion of the display 110. In this example, the speaker 114 is offset from the opening 112, and sound from the speaker may be routed to and through the opening 112 by one or more device structures.

In various implementations, the housing 106 and/or the display 110 may also include other openings, such as openings for one or more microphones, one or more pressure sensors, one or more light sources, or other components that receive or provide signals from or to the environment external to the housing 106. Openings such as opening 108 and/or opening 112 may be open ports or may be completely or partially covered with a permeable membrane or a mesh structure that allows air and/or sound to pass through the openings. Although two openings (e.g., opening 108 and opening 112) are shown in FIG. 1, this is merely illustrative. One opening 108, two openings 108, or more than two openings 108 may be provided on the one or more sidewalls of the housing 106, on a rear surface of housing 106 and/or a front surface of housing 106. One opening 112, two openings 112, or more than two openings 112 may be provided in the display 110. In some implementations, one or more groups of openings in housing 106 and/or groups of openings 112 in display 110 may be aligned with a single port of an audio component within housing 106. Housing 106, which may sometimes be referred to as a case, may be formed of plastic, glass, ceramics, fiber composites, metal (e.g., stainless steel, aluminum, etc.), other suitable materials, or a combination of any two or more of these materials.

The configuration of electronic device 100 of FIG. 1 is merely illustrative. In other implementations, electronic device 100 may be a computer such as a computer that is integrated into a display such as a computer monitor, a laptop computer, a media player, a gaming device, a navigation device, a computer monitor, a television, a headphone, an earbud, or other electronic equipment. As discussed herein, in some implementations, electronic device 100 may be provided in the form of a wearable device such as a smart watch. In one or more implementations, housing 106 may include one or more interfaces for mechanically coupling housing 106 to a strap or other structure for securing housing 106 to a wearer.

Figure 2:
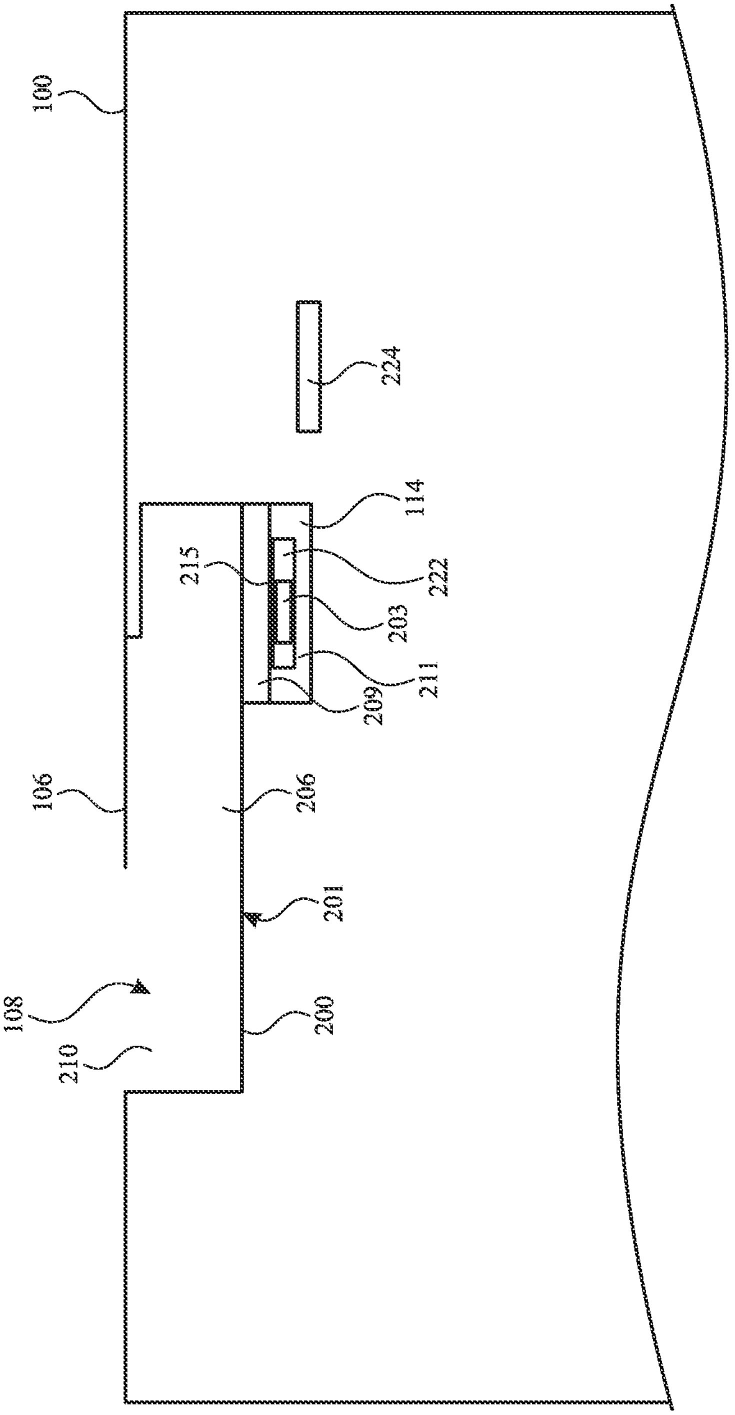
FIG. 2 illustrates a cross-sectional view of a portion of an example electronic device having a speaker in accordance with various aspects of the subject technology.

For example, FIG. 2 illustrates a cross-sectional side view of a portion of the electronic device 100 including a speaker 114. In this example, the speaker 114 may include a front volume 209 and a back volume 211. The front volume 209 and the back volume 211 may be separated by a sound-generating component 215 (e.g., a diaphragm or an actuatable component of a microelectromechanical systems (MEMS) speaker). The front volume 209 may be fluidly and acoustically coupled (e.g., via an acoustic duct 206) to the opening 108 in the housing 106. In one or more implementations, the acoustic duct 206 may be formed by a speaker housing 200 of a speaker module 201 in which the speaker 114 is disposed. In one or more other implementations, the acoustic duct 206 may be formed, entirely or in part, by one or more other device structures that guide sound generated by the speaker 114 through the opening 108 to the environment external to the housing 106. In the example of FIG. 2, the speaker 114 is spatially offset from the opening 108. However, in one or more others implementations, the speaker 114 may be aligned with the opening 108. In one or more implementations, the speaker 114 may be a compact speaker having a cross-sectional area of less than, for example two hundred $mm^2$, less than one hundred $mm^2$, or less than fifty $mm^2$.

In the example of FIG. 2, the speaker 114 includes speaker circuitry 222. The speaker circuitry may include, for example, a voice coil 203, a magnet, and/or other speaker circuitry. In one or more implementations, the electronic device 100 may also include other circuitry, such as device circuitry 224. Device circuitry 224 may include one or more processors, memory, acoustic components, haptic components, mechanical components, electronic components, or any other suitable components of an electronic device. In one or more implementations, the device circuitry 224 may also include one or more sensors, such as an inertial sensor (e.g., one or more accelerometers, gyroscopes, and/or magnetometers), a heart rate sensor, a blood oxygen sensor, a positioning sensor, a microphone, and/or the like. The speaker 114, the speaker housing 200, the sound-generating component 215, the speaker circuitry 222, and/or other portions and/or components of the electronic device 100 in the vicinity of the speaker 114 may have resonant characteristics that, alone and/or in combination, generate acoustic resonances for the audio output of the speaker 114.

The audio output of the speaker 114 may also effect the electrical characteristics of one or more electronic components of the electronic device 100. For example, audio outputs of the speaker 114, and/or mechanical operations for generating the audio outputs, may affect the resistance, impedance, capacitance, current, and/or other electrical characteristics of the speaker circuitry 222 (e.g., the voice coil 203) and/or of the device circuitry 224. The effect on the electrical characteristics on the speaker circuitry 222 (e.g., the voice coil 203) and/or of the device circuitry 224 may be increased when the audio output includes content at one or more resonances (e.g., mechanical and/or acoustic resonances) of the speaker 114, the speaker housing 200, the opening 108, and/or other features of the electronic device 100. For this reason, measuring one or more electrical characteristics of one or more electronic components of the electronic device 100 (e.g., the speaker circuitry 222 and/or the device circuitry 224 during operation of the electronic component(s) and/or the speaker) can provide information that can be used to make a determination of one or more resonant peaks of the audio output of the speaker 114.

In accordance with aspects of the subject disclosure, audio output can then be generated at the determined resonant peak(s) to provide audio outputs of enhanced (e.g., maximum) loudness.

Figure 3:
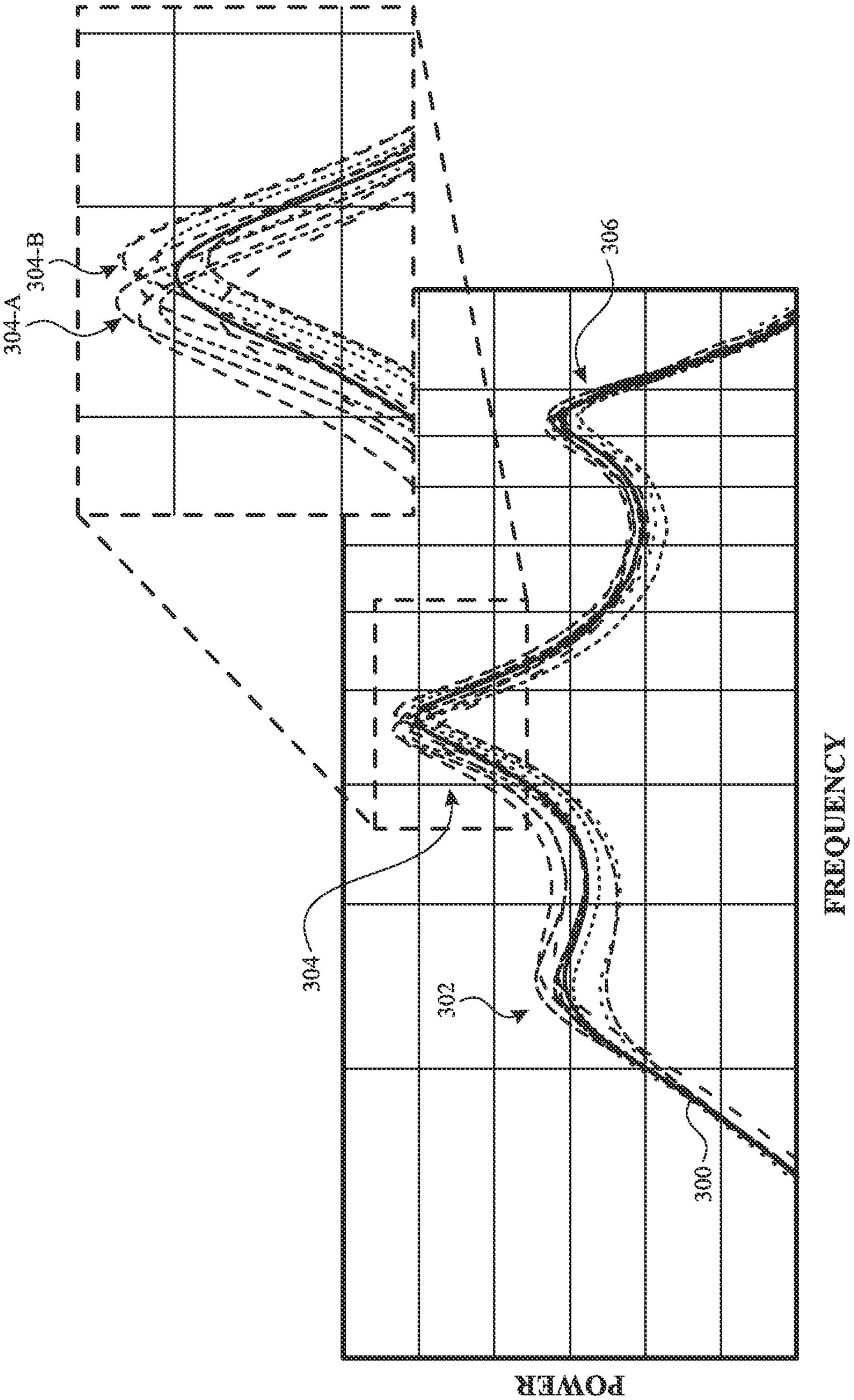
FIG. 3 illustrates an example chart of acoustic power as a function of acoustic frequency for various speakers having the same form factor in accordance with various aspects of the subject technology.

FIG. 3 illustrates an example chart of various curves 300, each indicating the acoustic power output from a speaker 114 of an electronic device 100 as a function of the acoustic frequency of the audio output from the speaker 114 of that electronic device 100. The multiple curves 300 indicate the acoustic power vs. frequency of multiple respective speakers 114 implemented in multiple respective electronic devices 100. In this example, each electronic device 100/speaker 114 combination generates audio output having a resonant peak 302, a resonant peak 304, and a resonant peak 306. For example, the resonant peak 302, the resonant peak 304, and the resonant peak 306 may be generated by various mechanical and/or acoustic resonances of the speaker 114, the speaker housing 200, the opening 108 and/or other features of the electronic device 100 in the vicinity of the electronic device 100. As one example, the resonance peak 304 may correspond to a mechanical resonance of the speaker 114 itself. As another example, the resonance peak 306 may correspond to an acoustic resonance of a front port 210 of the speaker 114 (e.g., a front port formed by the opening 108 and/or the speaker housing 200). In this example, each electronic device 100/speaker 114 combination generates audio output having three resonant peaks. However, this is illustrative, and other arrangements of speakers, speaker housings, speaker ports, device housings, etc. may cause a speaker to generate audio output with fewer than three, or more than three resonant peaks at the same or different frequencies and/or amplitudes as those illustrated in FIG. 3.

As shown in FIG. 3, even electronic devices 100/speakers 114 that have the same form factor (e.g., the form factor illustrated in FIG. 2) can have variations in the locations (in frequency) of the resonant peak 304. For example, the inset in FIG. 3 shows that the resonant peak 304-A of one electronic device 100/speaker 114 combination can occur at a frequency that is different from the frequency of the resonant peak 304-B of another electronic device 100/speaker 114 combination, even if the two electronic device 100/speaker 114 combinations have the same form factor. This difference can be, for example, due to mechanical tolerances in the speaker module 201, the housing 106, the speaker 114 and/or speaker circuitry 222, and/or the mounting of the speaker module 201 within the housing 106.

Moreover, even the curve 300 (e.g., including the locations in frequency of the resonant peaks) of a single electronic device 100/speaker 114 combination can change over time. For example, during operation, the voice coil 203 (e.g., included in the speaker circuitry 222) can heat up, which can change the mechanical resonance properties of the voice coil 203 itself and/or other surrounding speaker and/or device components. This change in the mechanical resonance properties of the speaker circuitry can cause a resulting change to the acoustic resonant peaks (e.g., resonant peak 304) of the audio output. In one or more implementations, the locations (in frequency) of resonant peaks such as the resonant peak 302, the resonant peak 304, and the resonant peak 306 can change differently from one or more others of the resonant peaks over time (e.g., during operation of the speaker 114 to generate audio outputs and/or over the lifetime of the electronic device). For example, the frequency location of a first resonant peak (e.g., resonant peak 304) that is generated by a mechanical resonance may shift during operation of the speaker 114, while the frequency location of a second resonant peak (e.g., resonant peak 306) may remain the same, or may shift in a different direction and/or by a different amount from the first resonant peak during operation of the speaker 114.

In some use cases, it can be desirable to be able to generate the loudest sounds possible with the speaker 114 using the lowest amount of power. For example, in an emergency situation in which a user (e.g., a wearer) of the electronic device 100 is lost or has become incapacitated or immobilized, it can be useful to be able to output an emergency alert using the speaker 114. In order, for example, to allow the emergency alert to be heard from a largest possible distance, it can be desirable to generate the loudest sound possible with the speaker 114. However, because it may take time for another person to hear the emergency alert, it may be desirable to be able to continue and/or repeat the emergency alert over a long period of time. In order to meet these competing desires for loudness and preservation of power, the electronic device 100 may generate audio outputs at one or more resonant frequencies of the electronic device 100 and/or the speaker 114 (e.g., at one or more of the resonant peaks, such as resonant peak 302, resonant peak 304, and/or resonant peak 306).

However, as described herein and illustrated in FIG. 3, the locations of the resonant peaks can vary from device to device and/or can change over time. Thus, fixed audio content that is intended to be output at a resonance peak, may instead be output at a frequency that is away from the resonant peaks. This can be disadvantageous because a reduction in audio power of 3 dB can be audibly different to a listener, and a reduction in audio power of 6 dB can decrease range at which an audio output can be heard by a human by half. For example, an audio output may be generated by a speaker 114 at the frequency of the resonant peak 304-A with an expectation that the audio output is generated at a resonant peak of the speaker and is thus audible by a human at a distance of 600 feet from the electronic device. However, in this example, if the actual resonant peak of the speaker 114 generating the audio output is at the location of the resonant peak 304-B, the audio output may only be actually audible by a human at a distance of 300 feet. This can reduce the efficiency of the audio output and the power usage of the speaker 114.

For these and other reasons, real time measurements of the resonant peaks at or around the time(s) at which the audio outputs are generated, and modification of the audio outputs to be generated at the measured resonant peaks, can be helpful in many use cases.

Figure 4:
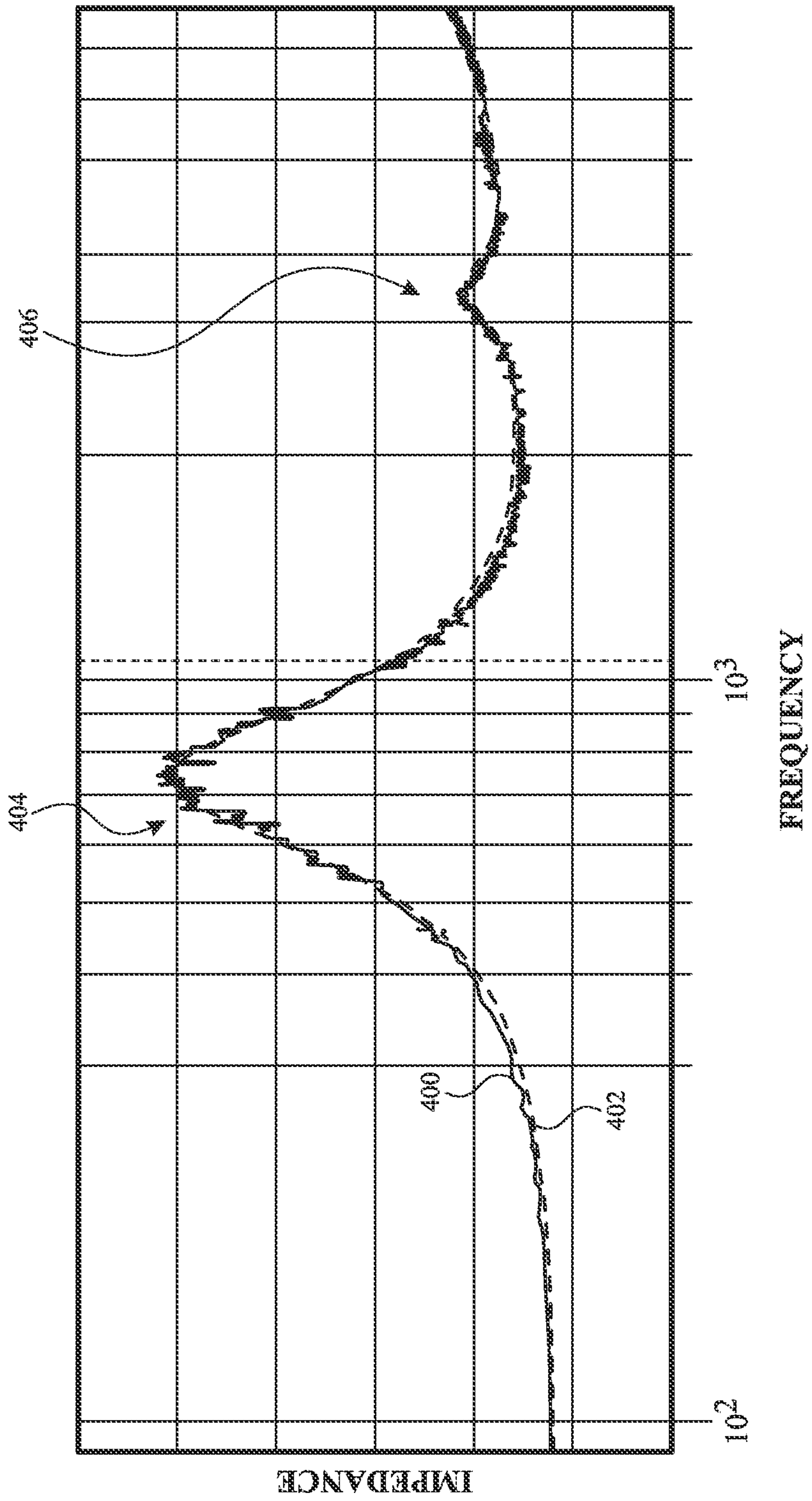
FIG. 4 illustrates an example chart of impedance as a function of acoustic frequency in accordance with various aspects of the subject technology.

FIG. 4 illustrates an example chart showing the effect, on an electrical characteristic (e.g., the impedance in this example) of an electronic component, of the generation of audio outputs at various frequencies. In the example of FIG. 4, a measured impedance 400 of an electronic component (e.g., the speaker circuitry 222 or the device circuitry 224) of the electronic device 100 is shown as a function of audio output frequency. For example, the measured impedance 400 may be obtained from the voice coil 203 of the speaker 114 while the speaker generates audio outputs over a range of frequencies. FIG. 4 also illustrates a modeled impedance 402 over the same frequency range as the measured impedance 400. For example, the modeled impedance 402 may be generated from a parameterized model that has been fit to the measured impedance 400.

In one or more implementations, the modeled impedance 402 may be generated from a parameterized curve in which one or more of the parameters of the curve are, or are related to, the resonant peaks of one or more components or features of the speaker 114 and/or the electronic device 100. In the example of FIG. 4, the measured impedance 400 and the modeled impedance 402 both include a resonant peak 404 and a resonant peak 406 in the respective impedance. As an example, the resonant peak 404 in the impedance may be generated when the audio output of the speaker 114 includes content at a mechanical resonance of the speaker 114 itself. As another example, the resonant peak 406 in the impedance may be generated when the audio output of the speaker 114 includes content at an acoustic resonance of a front port of the speaker 114 (e.g., a front port formed by the speaker housing 200 and/or the opening 108 in the housing 106).

In one or more implementations, the measured impedance 400 may be obtained by measuring the impedance of the speaker circuitry 222 (e.g., the voice coil 203 of the speaker) while outputting audio outputs of various frequencies with the speaker 114 (e.g., by generating a frequency sweep or white noise with the speaker 114). In one or more implementations, parameters of the modeled impedance 402 may be fit to the measured impedance 400. In one or more implementations, a confidence in the fit may be determined. In one or more implementations, one or more of the fitted parameters (e.g., including one or more parameters indicating one or more resonant peaks of the impedance and/or one or more acoustic resonance peaks of the electronic device 100/speaker 114 combination) may be provided to a content generator that generates and/or modifies the content of the upcoming audio output (e.g., for an emergency alert). In one or more implementations, the parameters may be provided to the content generator upon determining that the confidence in the fit meets a confidence threshold.

In one or more implementations, the parameterized model that generates the modeled impedance 402 may be a complex model that fits to both a measured electrical characteristic and a phase of that measured electrical characteristic. In various implementations, the parameters of the model may be single value parameters or may be frequency dependent parameters. In one or more implementations, all of the parameters of the model may be fit using all of the measured data in the measured impedance 400 across the entire frequency range of that data. In one or more other implementations, some parameters, such as mechanical resonance parameters, may be fit to a first portion of the measured impedance 400 within a first frequency range, and other parameters, such as acoustic resonance parameters, may be fit to a second portion of the data in the measured impedance 400 within a second (e.g., different) frequency range. In one or more implementations, all of the parameters of the model may be fit using a single electrical characteristic (e.g., a voltage, a current, a resistance, or an impedance) across the entire frequency range over which that electrical characteristic was measured. In one or more other implementations, a first electrical characteristic (e.g., a resistance) may be measured and modeled within a first frequency range and a second electrical characteristic (e.g., an impedance) may be measured and modeled within a second (e.g., different) frequency range.

In one or more use cases, the fitting of the parameters of the model may fail. For example, in a use case in which debris and/or fluid enters housing 106 through the opening 108 (e.g., and limits movement of the diaphragm or other sound-generating component of the speaker 114), the speaker 114 and/or the front port of the speaker may not exhibit a resonance at a location at which the model includes a resonant peak. For example, the parameterized model may model a mechanical resonance peak in a frequency range of between four hundred Hertz (Hz) and seven hundred Hz, and an acoustic resonance peak in a frequency range of between one kHz and four kHz (as examples). Thus, a failure (e.g., due to a lack of resonances in the expected frequency ranges due to debris or liquid) of the model to fit the measured electrical characteristic(s) (e.g., to within a confidence threshold) may indicate that the speaker 114 and/or the opening 108 is blocked or otherwise occluded. As discussed in further detail hereinafter, a blockage or occlusion of the speaker 114 and/or the opening 108 may be detected in other ways including, but not limited to, detecting an electrical characteristic that is different from (e.g., less than) an expected value of the electrical characteristic, or detecting a change (e.g., a drop) in the electrical characteristic.

In one or more implementations, determining that the speaker 114 and/or the opening 108 is blocked or otherwise occluded may cause the electronic device 100 to determine not to generate an audio output with the speaker 114. In one or more other implementations, the speaker 114 may instead be operated to attempt to clear the blockage or occlusion (e.g., by generating a motion of the speaker diaphragm to expel liquid form the speaker housing 200). As discussed in further detail hereinafter, in one or more implementations, the resonance of the speaker that is blocked or otherwise occluded (e.g., which may be different from the unblocked/un-occluded resonance of the speaker) may be determined, and the speaker 114 may be operated at that resonance to eject or clear the blockage or occlusion.

Figure 5:
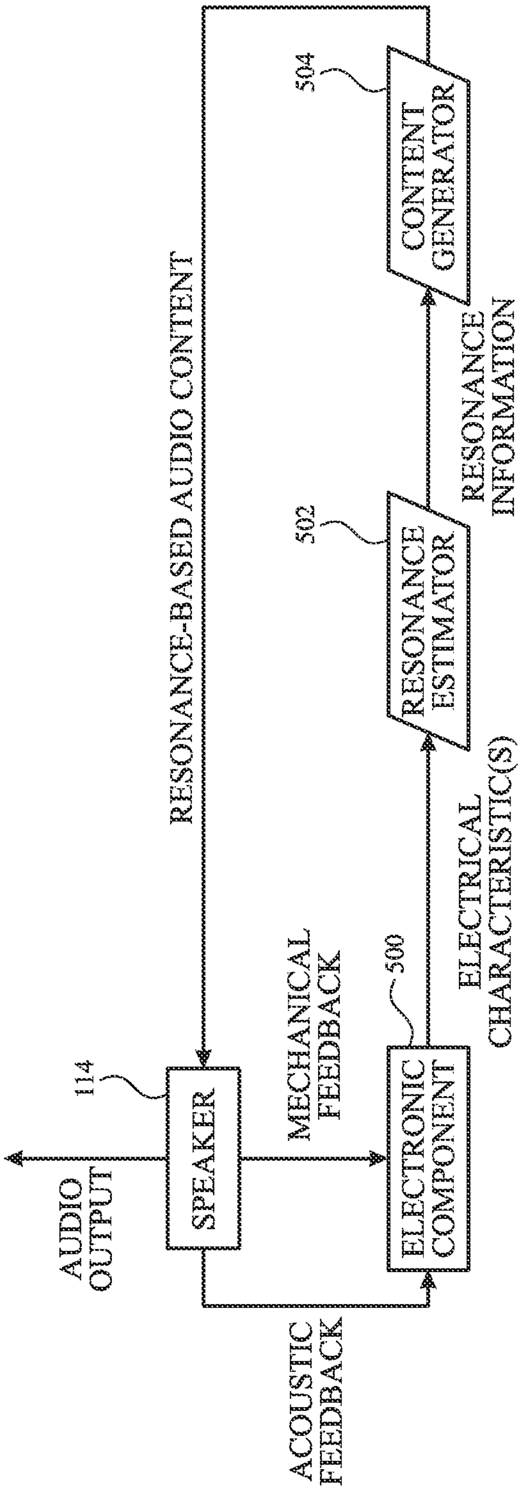
FIG. 5 illustrates a schematic diagram of an architecture for providing adaptive resonance-controlled audio output in accordance with various aspects of the subject technology.

FIG. 5 illustrates an example architecture for providing adaptive resonance-based audio outputs (e.g., with the electronic device 100). Various portions of the architecture of FIG. can be implemented in software or hardware, including by one or more processors and a memory device containing instructions, which when executed by the processor cause the processor to perform the operations described herein. For example, in FIG. 5, the rectangular boxes may indicate that the speaker 114 and the electronic component 500 may be hardware components, and the trapezoidal boxes may indicate that the resonance estimator 502 and the content generator 504 may be implemented in software, including by one or more processors and a memory device containing instructions, which when executed by the processor cause the processor to perform the operations described herein.

In the example of FIG. 5, the speaker 114 generates an audio output. For example, the audio output may be an audio output for determining resonant peaks of the speaker 114 and/or the electronic device 100. For example, the audio output may be white noise spanning a frequency range of interest, or an audio output that sweeps through a the frequency range of interest. The audio output for determining the resonant peaks may be generated separately from other audio output(s) (e.g., an emergency alert audio output or output of user-selected content) or may be provided in combination with one or more other audio outputs (e.g., as background noise combined with the other audio output(s)).

As illustrated in FIG. 5, generating the audio output with the speaker 114 may cause acoustic feedback and/or mechanical feedback to an electronic component 500. For example, the electronic component 500 may be the speaker circuitry 222 (e.g., the voice coil 203) and/or the device circuitry 224 of FIG. 2. For example, the acoustic feedback may include acoustic vibrations of the electronic component 500 due to the audio output from the speaker 114. For example, the mechanical feedback may include vibrations of the electronic component 500 due to mechanical movements and/or vibrations of the speaker 114 for generating the audio output. When the audio output from the speaker 114 is generated at a resonant peak of the electronic device 100 and/or speaker 114, the effect of the acoustic feedback and/or the mechanical feedback on the electronic component may be increased, as indicated, for example, by the resonant peak 404 and the resonant peak 406 of FIG. 4.

As shown in FIG. 5, one or more electrical characteristics of the electronic component 500 may be obtained during the generation of the audio output by the speaker 114 (e.g., while the acoustic and/or mechanical feedback is being received by the electronic component 500). As examples, the electrical characteristics may include a measured current, voltage, resistance, impedance, phase, or other electrical characteristic of the electronic component 500. As discussed herein in connection with, for example, FIG. 4, the electrical characteristic(s) of the electronic component 500 may change with the frequency of the audio output.

In the example of FIG. 5, a resonance estimator 502 at the electronic device 100 may determine one or more resonant frequencies (e.g., resonant frequencies of the resonant peak 302, the resonant peak 304, and/or the resonant peak 306 of FIG. 3) of the speaker 114 and/or the electronic device 100 using the obtained electrical characteristics of the electronic component 500. For example, the resonance estimator 502 may adjust the parameters of a parameterized model of the electrical characteristic(s) of the electronic component 500 to fit the measured electrical characteristic(s). The adjusted parameters may then be used to determine the one or more resonant frequencies of the speaker 114 and/or the electronic device 100. In one or more implementations, one or more of the adjustable parameters of the parameterized model may be the resonant frequencies. In one or more other implementations, the one or more of the adjustable parameters of the parameterized model may be other parameters (e.g., physical parameters and/or electrical parameters) that can be mapped to the resonant frequencies of the audio output by the resonance estimator 502.

In the example of FIG. 5, resonance information obtained by the resonance estimator 502 may be provided to a content generator 504. For example, the resonance information may include one or more of the adjusted parameters of the parameterized model, one or more resonant frequencies, and/or other information from which one or more resonant frequencies can be derived. As shown, the content generator 504 may generate resonance-based audio content using the resonance information, and may provide the resonance-based audio content for subsequent audio output by the speaker 114. For example, the output generator may generate resonant-based audio content that includes content at one or more resonant peaks determined from the electrical characteristic(s) by the resonance estimator 502.

The operations illustrated in FIG. 5 may be performed once (e.g., during manufacturing or prior to generating an emergency alert audio output) or may be repeated two, three, or more than three times. In one or more implementations, the operations of FIG. 5 may be performed prior to each repetition of a repeating audio output. For example, in a speaker having a cross-sectional area of less than approximately one hundred $mm^2$, audio output of tens of tones or other sounds within a time period of approximate ten seconds may cause the voice coil of the speaker generating that audio output to heat up by an amount that can cause the resonant frequency of that speaker to change (e.g., to lower frequencies). Accordingly, it can be advantageous to determine the location of the resonant peak(s) of the speaker 114 and/or the electronic device 100 repeatedly and/or at various times during the operation and/or lifetime of the electronic device 100. In one or more implementations, the operations of FIG. 5 may be performed during an emergency alert audio output (e.g., by adding low levels of white noise to or intermittently between the relatively higher levels of output for the emergency alert, and measuring resulting effects on the electrical characteristics of the electronic component 500).

In various implementations, the content generator 504 may generate new audio content based on the resonance information and/or may modify existing audio content based on the resonance information.

Figure 6:
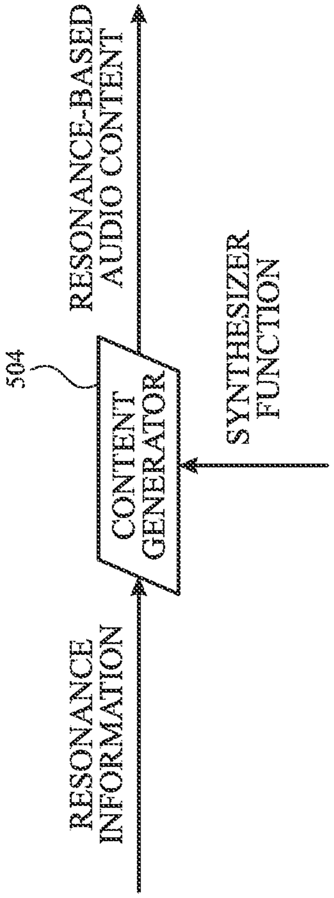
FIG. 6 illustrates a schematic diagram of a process for synthesizing resonance-based audio content based on a resonance determined from electrical characteristics of an electronic component in accordance with various aspects of the subject technology.

For example, FIG. 6 illustrates an implementation in which the content generator 504 generates new audio content based on the resonance information. In this example, the content generator 504 may receive (e.g., in addition to the resonance information from the resonance estimator), a synthesizer function. For example, the synthesizer function may include code corresponding to a coded recipe for generating audio content at one or more desired frequencies. For example, the content generator 504 may provide the resonance information as an input to the synthesizer function, and the resonance-based audio content may be generated as a resulting output of the synthesizer function.

In one or more implementations, the synthesizer function may be implemented as a coded recipe that defines a duration, a cadence, a timbre, a gain envelope, and/or other acoustic features of one or more tones at one or more respectively frequencies that each correspond to one or more resonant frequencies of the speaker 114 (e.g., and/or resonant frequencies of other features of the electronic device 100). For example, the synthesizer function (e.g., the coded recipe) may define one or more frequencies of one or more tones in the resonance-based audio content by identifying one or more respective semitone bins into which the one or more resonant frequencies fall, and setting the frequencies of the output tones to the semitone frequency(ies) of the identified bin(s). In various implementations, the duration, cadence, and/or other acoustic features (e.g., a gain envelope) of the output tones may be fixed and predetermined in the synthesizer function, or may be adjustable based on the resonant frequencies (e.g., adjustable in a way that is defined by the synthesizer function). For example, a gain envelope that is defined by the synthesizer function may define fade-in and/or fade-out characteristics of an output tone. The fade-in and/or fade-out characteristics may be fixed or may be frequency-dependent. In one or more implementations, the synthesizer function may be coded to determine a duration of an output tone for loudness optimization. In various implementations, the resonance-based audio content generated based on the synthesizer function can include a single tone, an interval (e.g., two tones), a chord, or any other combination of tones having characteristics (e.g., duration, cadence, gain envelope, etc.) defined by the synthesizer function. Synthesizing the resonance-based audio content (e.g., on-the-fly) can provide computational efficiencies in terms of memory (e.g., flash memory) and/or other computing resources (e.g., processing power) in comparison with, for example, playback of an audio file and/or pitch shifting of existing audio. Because the resonance-based audio content in the example of FIG. 6 is code generated, the electronic device can also perform power efficiency operations such as shutting down one or more amplifiers between tones, which saves quiescent power. In the example of FIG. 6, the synthesizer function is illustrated as being provided to the content generator 504. However, in one or more implementations the synthesizer function can be stored as a part of the content generator 504.

Figure 7:
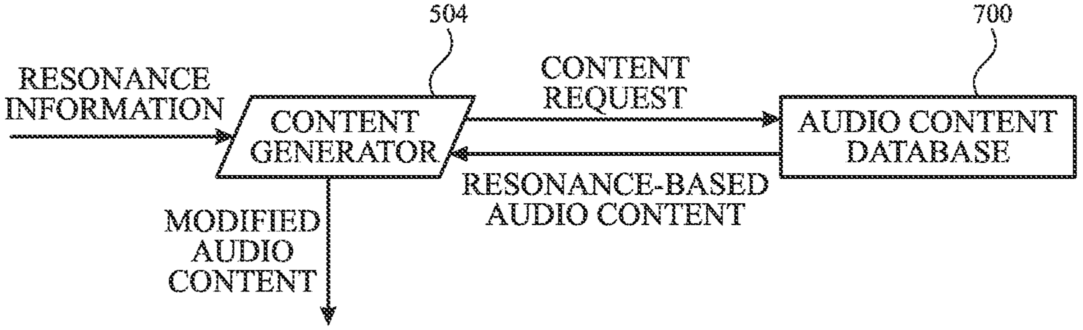
FIG. 7 illustrates a schematic diagram of a process for obtaining resonance-based audio content from a database using a resonance determined from electrical characteristics of an electronic component in accordance with various aspects of the subject technology.

As another example, FIG. 7 illustrates an implementation in which the content generator 504 obtains the resonance-based audio content from an audio content database 700. In this example, the content generator 504 obtains existing resonance-based audio content for one or more resonant frequency, as indicated by the resonance information, from a database of various resonance-based audio content files that have been previously stored at the electronic device 100 in connection with various respective resonant frequencies. In the example of FIG. 7, the content generator 504 provides a content request to the audio content database 700 and obtains the resonance-based audio content responsive to the content request. For example, the content request may include one or more resonant frequencies and/or one or more indices corresponding to the one or more resonant frequencies, and the previously stored resonance-based audio content in the audio content database 700 may be indexed or otherwise stored in associated with the one or more resonant frequencies and/or the one or more indices, for retrieval from the database using the one or more resonant frequencies and/or the one or more indices. In one or more implementations, the content generator 504 and/or the audio content database 700 may store a lookup table with which resonance-based audio content for various particular resonant frequencies can be located.

In the example of FIG. 7, the audio content database 700 stores resonance-based audio content for various resonant frequencies. However, in one or more other implementations, the audio content database 700 may store audio content for a single audio output at or around a given resonant frequency, and the content generator 504 may modify (e.g., pitch shift) the stored audio content based on the resonance information to obtain audio output for one or more resonance frequencies different from the resonance frequency associated with the stored audio content.

In various implementations, the resonance-based audio content can be resonance-based audio content for one particular resonant frequency, or can be resonance-based audio content that is optimized for multiple resonant frequencies (e.g., including audio content at and/or near the multiple resonant frequencies). In one or more implementations, the resonance-based audio content may be content for an emergency alert from the electronic device 100. In one or more implementations, the emergency alert may be triggered by a user input, or may be triggered by one or more sensors of the electronic device 100 (e.g., a fall detection sensor that utilizes one or more accelerometers, a heart rate sensor, a blood oxygen sensor, or the like). In various implementations, the resonance-based audio content may include a series of ascending or descending musical notes (e.g., with one or more of the musical notes at the resonant frequencies), an audio frequency sweep, or a multitone output (as examples).

Figure 8:
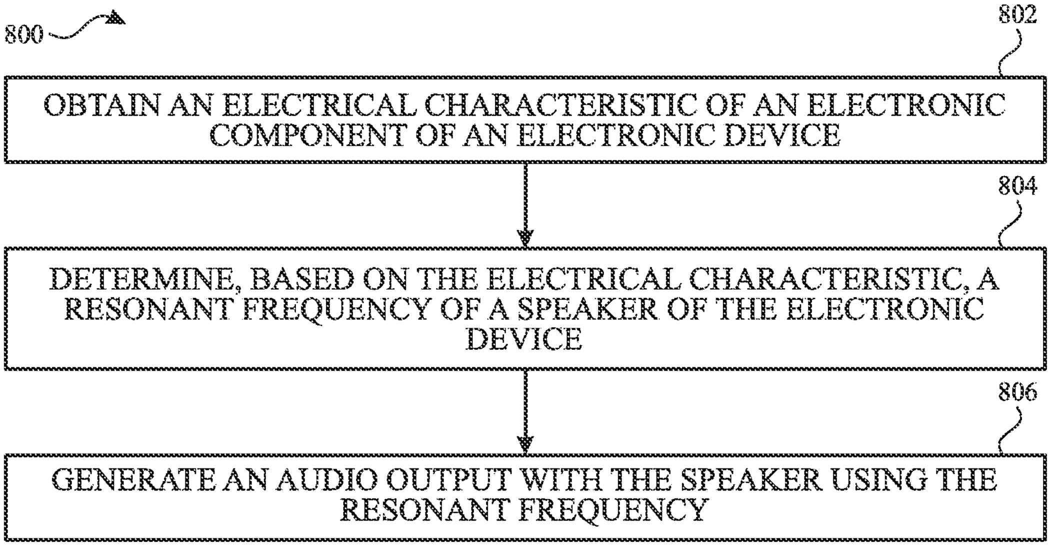
FIG. 8 illustrates a flow chart of illustrative operations that may be performed for operating a speaker in accordance with various aspects of the subject technology.

FIG. 8 illustrates a flow diagram of an example process for operating a speaker of an electronic device, in accordance with one or more implementations. For explanatory purposes, the process 800 is primarily described herein with reference to the electronic device 100 and the speaker 114 of FIGS. 1 and 2. However, the process 800 is not limited to the electronic device 100 and the speaker 114 of FIGS. 1 and 2, and one or more blocks (or operations) of the process 800 may be performed by one or more other components and other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

In the example of FIG. 8, at block 802, an electrical characteristic of an electronic component (e.g., electronic component 500) of an electronic device (e.g., electronic device 100) may be obtained. For example, the electrical characteristic may be obtained during operation of the electronic component and/or a speaker of the electronic device. As examples, the electrical characteristic may include at least one of a voltage, a current, a resistance, or an impedance. As an example, the electronic component may include a component (e.g., speaker circuitry 222 or a component thereof) of a speaker (e.g., speaker 114) of the electronic device, such as a voice coil of the speaker (e.g., speaker circuitry that receives mechanical and/or acoustic feedback when the speaker is operating to generating audio output). The electrical characteristic may be determined during operation of the electronic component while and/or as part of operating the speaker of the electronic device. As another example, the electronic component may be a component (e.g., device circuitry 224) of the electronic device that is separate from the speaker and that receives mechanical and/or acoustic feedback when the speaker is operating to generating audio output.

At block 804, the electronic device may determine, based on the electrical characteristic, a resonant frequency of a speaker of the electronic device. For example, determining the resonant frequency of the speaker based on the electrical characteristic may include adjusting a model based on the electrical characteristic, and obtaining the resonant frequency from the adjusted model. For example, the model may be a parameterized model of the electrical characteristic over a frequency range over which the electrical characteristic was obtained, and adjusting the model may include adjusting one or more parameters of the model to fit the obtained electrical characteristic (e.g., as described herein in connection with FIGS. 4 and 5). In one or more implementations, more than one resonant frequency can be determined based on the electrical characteristic.

At block 806, an audio output may be generated with the speaker using the resonant frequency. In one or more implementations, generating the audio output includes synthesizing, by the electronic device (e.g., by content generator 504 using a synthesizer function), audio content at the resonant frequency (e.g., as discussed herein in connection with FIG. 6), and outputting the synthesized audio content with the speaker. For example, synthesizing the audio content at the resonant frequency may include synthesizing the audio content according to a coded recipe that defines a duration and a frequency of a tone, the frequency of the tone corresponding to a semitone bin corresponding to the resonant frequency (e.g., as described herein in connection with FIG. 6). Synthesizing the audio content at the resonant frequency may also include defining a cadence of the tone in the audio content, according to the coded recipe.

In one or more other implementations, generating the audio output includes obtaining an audio file stored at the electronic device (e.g., from a database such as audio content database 700 of FIG. 7), shifting a pitch of audio content in the audio file based on the resonant frequency, and outputting, by the speaker, the audio content with the pitch shifted based on the resonant frequency. For example, shifting the pitch of the audio file may include shifting the pitch of an output tone or other output sound, indicated by the audio file for output at a first frequency that is different from the determined resonant frequency, to the determined resonant frequency.

In one or more implementations, the electronic device may detect an emergency condition and generate the audio output responsive to detecting the emergency condition. In one or more use cases, detecting the emergency condition may include receiving a user input for activating an emergency alert output in some use cases. In other use cases, detecting the emergency condition may include detecting the emergency condition with a sensor (e.g., an inertial sensor such as an accelerometer, a heart rate sensor, a blood oxygen sensor, a microphone, or another sensor) of the electronic device. As examples, detecting the emergency condition may include detecting a fall and/or a lack of movement of a user or a wearer of the electronic device.

In one or more implementations, the process 800 may also include detecting a change in the electrical characteristic while generating the audio output with the speaker. For example, the speaker itself, a component thereof, and/or or a nearby or surrounding component may heat up due to the operation of the speaker that is generating the audio output, which can cause a change one or more electrical characteristics of the electronic component. In one or more implementations, the process 800 may also include determining an updated resonant frequency different from the resonant frequency based on the detected change in the electrical characteristic. For example, heating of the voice coil of the speaker can cause a resonant frequency (e.g., due to a mechanical resonance) of the speaker to shift (e.g., downward) in frequency during operation of the speaker. In one or more implementations, the process 800 may also include modifying the audio output based on the updated resonant frequency. For example, modifying the audio output based on the updated resonant frequency may include shifting the pitch of one or more tones or other sounds in an existing audio file being used to generate the audio output to a different pitch corresponding to the updated resonant frequency. As another example, modifying the audio output based on the updated resonant frequency may include obtaining a new audio file from an audio content database, the new audio file including audio content at the updated resonant frequency. As another example, modifying the audio output based on the updated resonant frequency may include synthesizing new audio content at the updated resonant frequency using a synthesizer function.

In one or more implementations, determining the resonant frequency at block 804 may include determining a first resonant frequency and a second resonant frequency of the speaker (e.g., and/or one or more additional resonant frequencies). In one or more implementations, the first resonance frequency may be due to a mechanical resonance of the speaker and the second resonant frequency may be due to an acoustic resonance of a front port of the speaker. In one or more implementations, generating the audio output may include generating the audio output based on the first resonant frequency and the second resonant frequency. For example, generating the audio output based on the first resonant frequency and the second resonant frequency may include synthesizing, selecting from a database, or modifying audio content that includes tones at the first resonant frequency and the second resonant frequency.

In one or more implementations, determining the updated resonant frequency different from the resonant frequency may include determining a first change in the first resonant frequency and a second change in the second resonant frequency, the first change different from the second change. For example, the first change and/or the second change may be respectively due to a change in a mechanical and/or an acoustic resonance shift, such as due to heating of the speaker and/or the electronic component. In one or more implementations, modifying the audio output based on the updated resonant frequency may include modifying a first portion (e.g., one or more first tones) of the audio output based on the first change and modifying a second portion (e.g., one or more second tones) of the audio output based on the second change. For example, modifying the first portion of the audio output based on the first change may include, for example, shifting the pitch of one or more tones of the audio output to a first updated resonant frequency determined by applying the first change the first resonant frequency. Modifying the second portion of the audio output based on the second change may include, for example, shifting the pitch of one or more other tones of the audio output to a second updated resonant frequency determined by applying the second change the second resonant frequency. In various use cases, the first change may be larger than, or in a different direction from, the second change.

In one or more implementations, the process 800 may also include detecting, based on a change in the electrical characteristic, debris in (e.g., or over) a speaker port of the speaker, and operating the speaker to purge the debris. In one or more implementations, responsive to detecting the debris based on the electrical characteristic, or the change the electrical characteristic, the electronic device may determine not to generate an audio output (e.g., until the electronic device determines that the debris has been removed or purged). In one or more other implementations, the frequency of the audio output from the speaker may be modified to a new resonant frequency that accounts for the detected debris.

Figure 9:
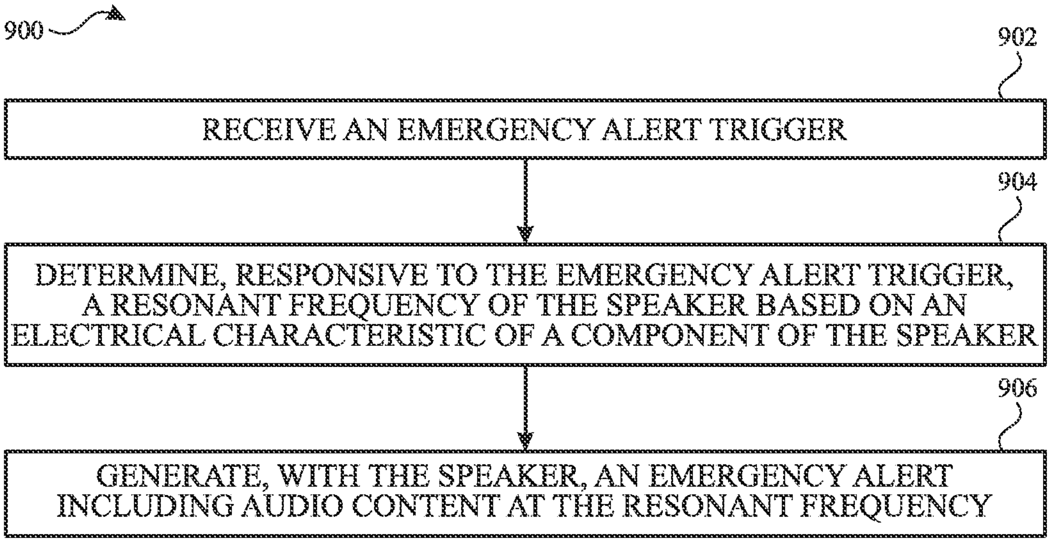
FIG. 9 illustrates a flow chart of illustrative operations that may be performed for providing an emergency alert with an electronic device in accordance with various aspects of the subject technology.

FIG. 9 illustrates a flow diagram of an example process for generating an emergency alert with an electronic device, in accordance with one or more implementations. For explanatory purposes, the process 900 is primarily described herein with reference to the electronic device 100 and the speaker 114 of FIGS. 1 and 2. However, the process 900 is not limited to the electronic device 100 and the speaker 114 of FIGS. 1 and 2, and one or more blocks (or operations) of the process 900 may be performed by one or more other components and other suitable devices. Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

In the example of FIG. 9, at block 902, an electronic device (e.g., electronic device 100) may receive an emergency alert trigger. For example, in one or more implementations, the electronic device may include one or more sensors, and the emergency alert trigger comprises a sensor-based trigger based on a sensor signal from the sensor. For example, the electronic device may include an inertial sensor such as an accelerometer, a heart rate sensor, a blood oxygen sensor, a microphone, and/or other sensors. Using one or more of the sensors, the electronic device may generate the emergency alert trigger by detecting, as examples, a fall or a period of immobility by a user or a wearer of the electronic device. As another example, the emergency alert trigger may be a user input, such as a user input (e.g., a button press, a turn of a dial, an input to a touch-sensitive surface, a voice input, and/or any combination thereof) to initiate an emergency alert.

At block 904, the electronic device may determine, responsive to the emergency alert trigger, a resonant frequency of a speaker of the electronic device based on an electrical characteristic of a component of the speaker. For example, determining the resonant frequency may include performing any or all of the operations described herein in connection with the resonance estimator 502 of FIG. 5 and/or block 804 of FIG. 8.

At block 906, the electronic device may generate, with the speaker, an emergency alert including audio content at the resonant frequency. As examples, the electronic device may synthesize the audio content at the resonance frequency, may obtain a previously stored audio file including audio content at the resonance frequency, and/or may modify the content of an existing audio file to shift the pitch of the content to the resonant frequency. Generating the emergency alert may include performing any or all of the operations described herein in connection with the content generator 504 of FIG. 5 and/or block 806 of FIG. 8.

In various examples described herein, determination of a resonant frequency based on an electrical characteristic such as an impedance includes deriving the resonant frequency by adjusting or fitting a parameterized model of the impedance. However, in one or more use cases in which a speaker is occluded by liquid (e.g., water) or other debris, the dynamic nature of an occlusion (e.g., the amount, the positioning, and/or the composition of an occlusion) may make it difficult, or impossible, to model the impedance of an occluded speaker. Accordingly, in some other examples, the resonant frequency of a speaker that is occluded by liquid or other debris may be determined by operating the speaker across a range of output frequencies, measuring a value of an electrical characteristic at each output frequency, and determining the resonance frequency by selecting the output frequency at which the value of the electrical characteristic is highest among the measured values of the electrical characteristic.

Figure 10:
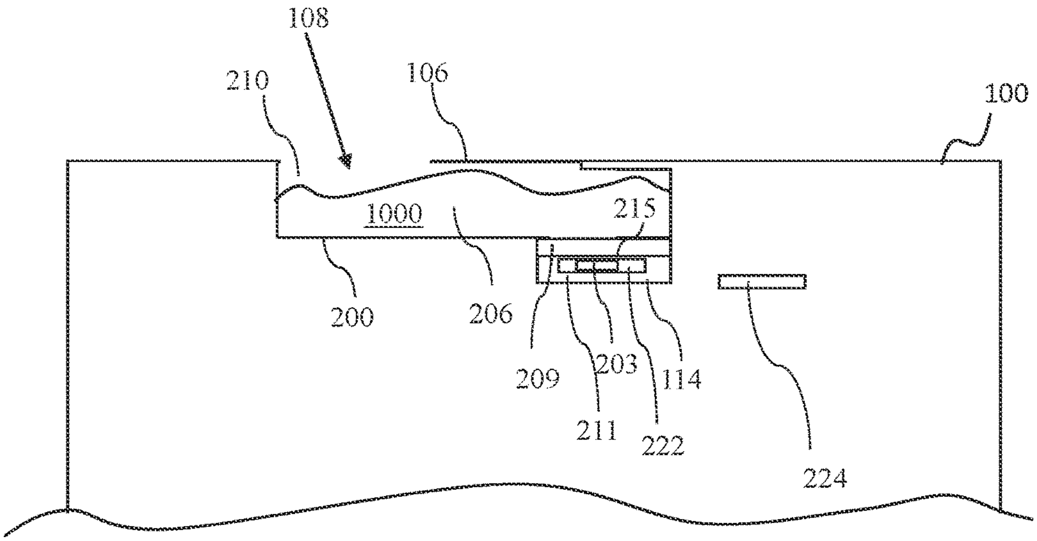
FIG. 10 illustrates a cross-sectional view of a portion of an example electronic device having an occluded speaker in accordance with various aspects of the subject technology.

For example, FIG. 10 illustrates a use case in which the speaker 114 of the electronic device 100 is occluded by an occlusion 1000. For example, the occlusion 1000 may be a liquid (e.g., water, oil, or any other fluid) and/or other debris (e.g., dust, dirt, sand, or the like) that has entered into the front port 210 (e.g., and/or into the acoustic duct 206 and/or the front volume 209 of the speaker 114) via the opening 108. As one illustrative example, water can flow into the front port 210 and occlude the speaker 114 when the electronic device 100 is splashed or submerged in water (e.g., when the wearer of a smart watch goes swimming, washes dishes or hands, is exposed to rain, or otherwise encounters water).

The presence of the occlusion 1000 in the front port 210 may change the acoustic properties of the speaker 114, the acoustic duct 206, and/or the front port 210. For example, the occlusion 1000 can change the resonance of the speaker 114, the acoustic duct 206, and/or the front port 210. This change in the resonance can be used to detect the presence of the occlusion 1000 in one or more implementations. For example, the occlusion 1000 may be detected by detecting a change (e.g., a drop, such as by as much as or more than ten percent, twenty percent, thirty percent, forty percent, or fifty percent) in the resonant frequency of the speaker 114, the acoustic duct 206, and/or the front port 210 and/or by detecting a change in a corresponding electrical characteristic of an electronic component (e.g., electronic component 500) of the electronic device as described herein. As another example, the occlusion 1000 may be detected by determining that a value of the electrical characteristic is different from (e.g., lower than, such as by as much as or more than ten percent, twenty percent, thirty percent, forty percent, or fifty percent) the value of the electrical characteristic that is expected when the speaker 114, the acoustic duct 206, and/or the front port 210 are un-occluded. As another example, the occlusion 1000 may be detected by determining that a current value of the electrical characteristic cannot be fit to a model of the electrical characteristic as described herein (e.g., by attempting to fit the model to the current value and determining that the fit statistically fails).

In one or more implementations, when the occlusion 1000 is detected, the electronic device 100 may determine a current resonant frequency of the speaker 114, the acoustic duct 206, and/or the front port 210 while the speaker 114 is occluded. The electronic device 100 may then operate the speaker 114 at a frequency that is based on the determined resonant frequency (e.g., by vibrating the sound-generating component 215 at the frequency) to eject or expel the occlusion 1000.

Figure 11:
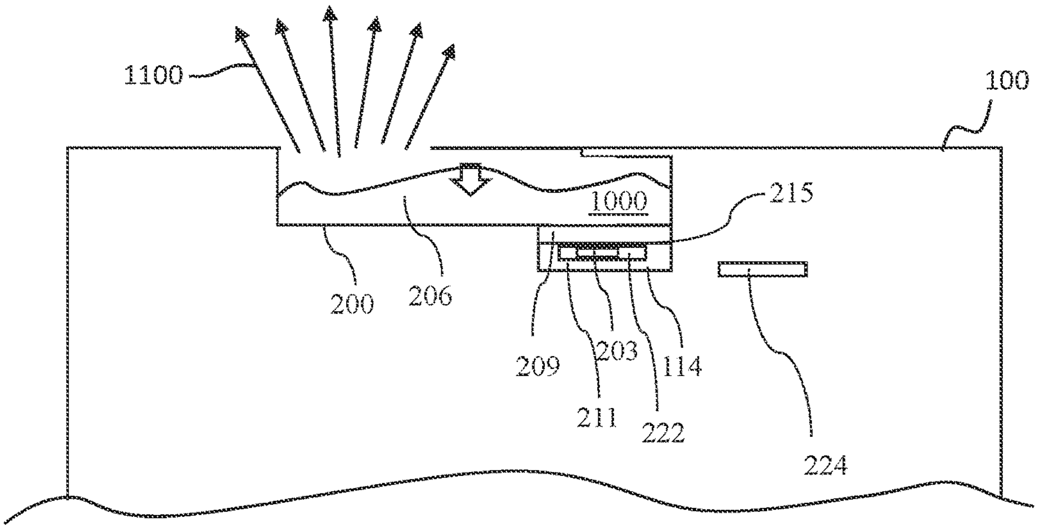
FIG. 11 illustrates a cross-sectional view of the portion of the example electronic device of FIG. 10 ejecting an occlusion by operating a speaker at a resonance frequency in accordance with various aspects of the subject technology.

For example, FIG. 11 illustrates an example use case in which at least a portion 1100 of the occlusion 1000 is ejected from the front port 210 via the opening 108 by the speaker 114 operating at the frequency that has been determined based on the resonant frequency. FIG. 11 also illustrates how, as the portion 1100 is ejected, the amount of the occlusion 1000 decreases. In one or more use cases, the positioning of the occlusion 1000 may also change during or after operation of the speaker 114 to expel the portion 1100 of the occlusion. This change in the amount and/or positioning of the occlusion 1000 can also change the acoustic properties of the speaker 114, the acoustic duct 206, and/or the front port 210, including changing the resonant frequency of the speaker 114, the acoustic duct 206, and/or the front port 210, which can reduce the effectiveness of the speaker operation to continue ejecting the occlusion 1000.

Figure 12:
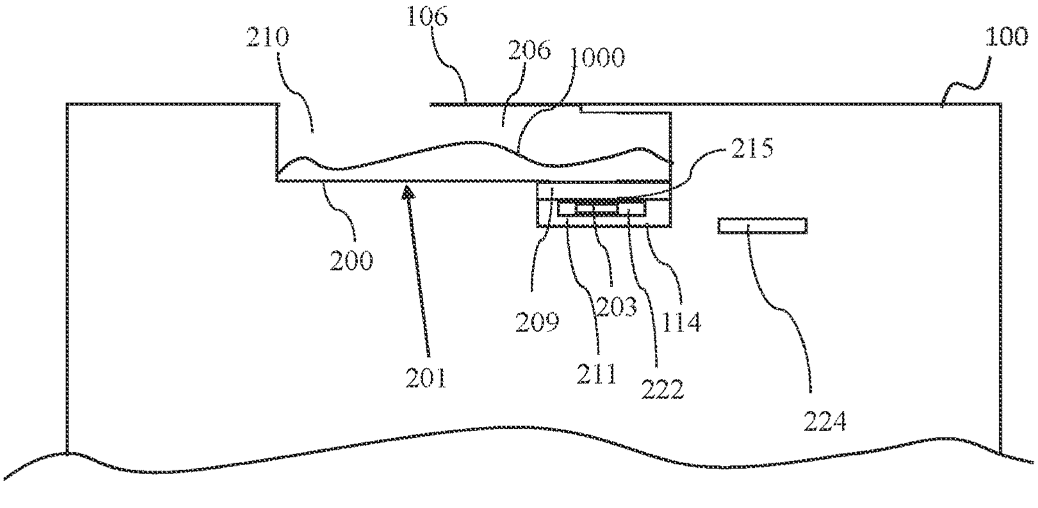
FIG. 12 illustrates a cross-sectional view of the portion of the example electronic device of FIG. 10 with a remaining portion of an occlusion in accordance with various aspects of the subject technology.

In one or more implementations, the electronic device 100 may periodically, while a remaining portion of the occlusion 1000 remains in the front port 210, determine an updated resonant frequency of the speaker 114, the acoustic duct 206, and/or the front port 210, and operate the speaker 114 at a new frequency that is based on the updated resonant frequency to continue ejecting the remaining portion of the occlusion 1000. For example, FIG. 12 illustrates an example use case in which a remaining portion of the occlusion 1000 remains in the front port 210 after the ejection illustrated in FIG. 11. In this example use case of FIG. 12, the electronic device 100 may determine an updated resonant frequency of the speaker 114, the acoustic duct 206, and/or the front port 210 with the remaining portion of the occlusion 1000 in the front port 210. For example, the updated resonant frequency may be different from the prior resonant frequency used in the ejection operation shown in FIG. 11, by as much as or more than three percent, five percent, or ten percent (as examples). As an example, a resonant frequency of around 800 Hertz (Hz) without an occlusion can drop to below 400 Hz with an occlusion, and can vary by between 25 Hz and 150 Hz between iterations of an occlusion ejection operation in some use cases.

The electronic device 100 may then operate the speaker at the new frequency that is based on the updated resonant frequency to continue ejecting the remaining portion of the occlusion 1000. The electronic device 100 may iteratively determine an updated resonant frequency, determine an output frequency based on the resonant frequency, and operate the speaker 114 at the determined output frequency, to eject the occlusion 1000. In one or more implementations, the electronic device 100 may continue to iteratively perform these occlusion ejection operations with the iteratively updated resonant frequencies, until an ejection termination threshold has been reached. As one illustrative example, the ejection termination threshold may be a threshold value (e.g., an expected value) of an electrical characteristic (e.g., a current, a voltage, or an impedance) above which occlusion is determined to be not present, and below which occlusion is determined to be present. As another example, the iterative ejection process may continue until the model of the electrical characteristic can be again successfully (e.g., statistically) fit to the current value of the electrical characteristic.

In one or more implementations, for each determined resonant frequency, determining the output frequency at which to operate the speaker 114 to expel the occlusion 1000 may include determining the output frequency to be the same as the resonant frequency. However, in one or more implementations, as the resonant frequency changes, outputting the changing resonant frequencies without modification could, if the resonant frequencies are in a human-audible frequency range, cause the speaker 114 to output an audibly unpleasant combination of sounds that may be disturbing to or otherwise undesirable for a user of the electronic device. Accordingly, in one or more implementations, the electronic device 100 may determine the resonant frequency, and then determine an output frequency at which to operate the speaker 114 by selecting, from among the notes or tones of a major or minor scale in which a prior output frequency is included, a frequency that is closest to the resonant frequency.

For example, if the speaker 114 was recently operated (e.g., in a prior iteration of an occlusion ejection operation with the speaker 114) at a first output frequency corresponding to a tone in a major scale, the output frequency for a current iteration of the occlusion ejection operation may be selected to be another tone, from the same major scale, that is closest in frequency to the current resonant frequency of the speaker 114, the acoustic duct 206, and/or the front port 210. In this way, the efficiency of using resonant frequencies to expel or eject an occlusion can be combined with a predetermined pattern of tones (e.g., the major or minor scale) to generate an audibly pleasant output (e.g., a melody or melody-like output) from the speaker during the expelling or ejection operations. In various implementations, tone switching among tones in a major or minor scale can be performed discontinuously (e.g., by starting output of a new tone after stopping output of a prior tone without outputting any intervening tones) or gradually (e.g., by providing an output that sweeps through one or more frequencies between the prior tone and the new tone, which may also cause the output to pass through one or more resonant frequencies on the way between tones that are selected to be near resonant frequencies). In various implementations, the output frequency may be determined by the content generator 504 as described herein, by obtaining a file with audio content at the determined output frequency from the audio content database 700 (e.g., using a lookup table), or by synthesizing audio content at the determined output frequency (e.g., as described herein in connection with FIG. 6).

In various examples described herein, a resonant frequency of the speaker 114, the acoustic duct 206, and/or the front port 210 can be determined by fitting the parameters of a model of an electrical characteristic of an electronic component (e.g., electronic component 500) to a current measurement of the electrical characteristic. However, as described herein, in use cases in which the speaker 114, the acoustic duct 206, and/or the front port 210 is occluded (e.g., by an occlusion 1000), the acoustic properties (e.g., including the resonant frequency) of the speaker 114, the acoustic duct 206, and/or the front port 210, may change to the extent that the model of the electrical characteristic (which is mechanically and/or acoustically effected by the operation of the speaker 114 as described herein in connection with FIG. 5) cannot be successfully fit to the current value of the electrical characteristic. Accordingly, in one or more implementations, determining the resonant frequency of the speaker 114, the acoustic duct 206, and/or the front port 210 can be performed, based on a determined value of an electrical characteristic, without using a model of the electrical characteristic.

For example, in one or more implementations, the speaker 114 may be operated at multiple frequencies (e.g., by outputting noise content including multiple frequencies or by outputting a sweep across a range of acoustic frequencies), and the electrical characteristic (e.g., the current, voltage, and/or impedance) can be measured during the output at each of the multiple frequencies. The frequency at which the value of the electrical characteristic is the highest among the measured electrical characteristics can be determined to be the current resonant frequency of the occluded speaker 114, acoustic duct 206, and/or front port 210.

In one or more implementations, the electrical characteristic may be an impedance of an electronic component 500 (e.g., a voice coil 203 of the speaker 114), and measuring the impedance may include measuring a voltage across the voice coil and deriving the impedance using the measured voltage and a known current through the voice coil. In one or more other implementations, current through the voice coil may be a fixed current and the voltage may be used as a proxy for the impedance (as the current does not change), and the electrical characteristic, for which the peak value indicates the resonant frequency, can be the voltage across the voice coil.

In one or more implementations, a low noise high gain circuit (e.g., a low-amplitude mode output driver) of an amplifier for the speaker 114 may be used to operate the speaker 114 at the multiple frequencies (e.g., using a fixed current) to determine the peak electrical characteristic value from which the resonant frequency can be determined. For example, using a low-amplitude mode output driver to operate the speaker 114 at the multiple frequencies can allow the speaker 114 to be operated at a low enough amplitude for the output of the speaker at the multiple frequencies can be inaudible to a user of the electronic device (e.g., even if one or more of the multiple frequencies are in the human audible frequency range). In one or more implementations, the low-amplitude mode driver can provide a low level differential current output, and can enter and exit a low-amplitude mode quickly (e.g., in less than two milliseconds, or less than five milliseconds), such that each measurement of the resonant frequency of an occluded speaker can be performed quickly.

Figure 13:
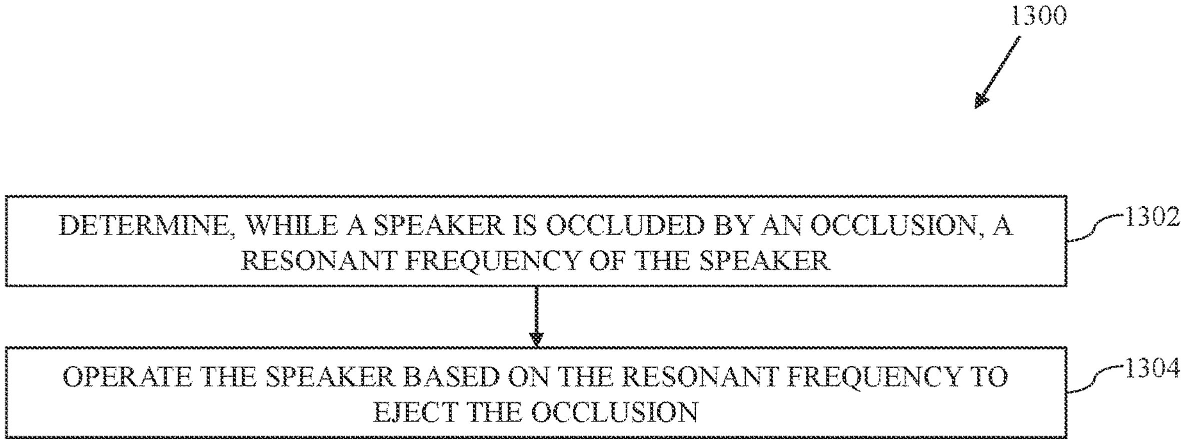
FIG. 13 illustrates a flow chart of illustrative operations that may be performed for adaptive resonance-based occlusion ejection in accordance with various aspects of the subject technology.

FIG. 13 illustrates a flow diagram of an example process for occlusion ejection using one or more resonant frequencies of a speaker, in accordance with one or more implementations. For explanatory purposes, the process 1300 is primarily described herein with reference to the electronic device 100 and the speaker 114 of FIGS. 1 and 2. However, the process 1300 is not limited to the electronic device 100 and the speaker 114 of FIGS. 1 and 2, and one or more blocks (or operations) of the process 1300 may be performed by one or more other components and other suitable devices. Further for explanatory purposes, the blocks of the process 1300 are described herein as occurring in serial, or linearly. However, multiple blocks of the process 1300 may occur in parallel. In addition, the blocks of the process 11300 need not be performed in the order shown and/or one or more blocks of the process 1300 need not be performed and/or can be replaced by other operations.

In the example of FIG. 13, at block 1302, an electronic device (e.g., electronic device 100) may determine, while a speaker (e.g., speaker 114) is occluded by an occlusion (e.g., occlusion 1000), a resonant frequency of the speaker. For example, determining the resonant frequency may include operating the speaker at multiple output frequencies, and determining the resonant frequency based on a peak value of an electrical characteristic of an electronic component (e.g., electronic component 500) of a device that includes the speaker.

At block 1304, the electronic device may operate the speaker based on the resonant frequency to eject the occlusion. For example, operating the speaker based on the resonant frequency may include operating the speaker at the resonant frequency. As another example, operating the speaker based on the resonant frequency may include: determining an output frequency that is different from the resonant frequency, using the resonant frequency and a previous output frequency (e.g., a previous frequency at which the speaker was operated, based on a previously determined resonant frequency, during a previous iteration of an occlusion ejection operation with the speaker); and operating the speaker at the output frequency. For example, determining the output frequency that is different from the resonant frequency, using the resonant frequency and the previous output frequency, may include determining an output frequency that is in a major or minor scale with the previous output frequency.

In one or more implementations, the resonant frequency may be a first resonant frequency, operating the speaker based on the resonant frequency ejects a first portion of the occlusion, and the electronic device may also: determine, after the ejection of the first portion of the occlusion and while the speaker is occluded with a remaining second portion of the occlusion (e.g., as in the example of FIG. 12), a second resonant frequency of the speaker, the second resonant frequency different from the first resonant frequency; and operate the speaker based on the second resonant frequency to eject the remaining second portion of the occlusion.

In one or more implementations, prior to the determining of the resonant frequency and while the speaker is occluded by the occlusion, the electronic device may obtain a value of an electrical characteristic of an electronic component (e.g., electronic component 500) of the electronic device that includes the speaker, and determine the resonant frequency of the speaker based on the value of the electrical characteristic. For example, the electrical characteristic may be or include at least one of a voltage, a current, or an impedance. For example, the electronic component may include a component of the speaker. For example, the component of the speaker may include a voice coil (e.g., voice coil 203) of the speaker.

In one or more implementations, obtaining the value of the electrical characteristic may include: providing a fixed current through a voice coil of the speaker; obtaining a voltage across the voice coil of the speaker while providing the fixed current; and determining the resonant frequency of the speaker based on the voltage. In one or more implementations, determining the resonant frequency based on the value of the electrical characteristic may include: operating the speaker at multiple frequencies while the speaker is occluded by the occlusion; obtaining multiple respective values of the electrical characteristic while operating the speaker at the multiple frequencies; identifying a peak value of the multiple respective values of the electrical characteristic; and determining the resonant frequency based on the peak value of the multiple respective values (e.g., based on the frequency being output by the speaker when the value of the electrical characteristic is the peak value).

In one or more implementations, prior to determining the resonant frequency, the electronic device may detect the occlusion by: comparing the value of the electrical characteristic to an expected value of the electrical characteristic; and detecting the occlusion based on the comparing (e.g., by determining, based on the comparison, that the value of the electrical characteristic is different from the expected value by a threshold amount). In one or more implementations, prior to determining the resonant frequency, the electronic device may detect the occlusion based on a change in the value of the electrical characteristic (e.g., based on a drop in the value of the electrical characteristic by at least a threshold amount). In one or more implementations, prior to determining the resonant frequency, the electronic device may detect the occlusion based on a failure (e.g., a statistical failure, such as a fit metric being greater than a threshold fit value) of a model (e.g., a parameterized model) of the electrical characteristic to fit the value of the electrical characteristic.

In one or more implementations, the electronic device may iteratively perform the determining and the operating until the value of the electrical characteristic reaches an ejection termination threshold. In one or more implementations, the electronic device may, prior to determination of the resonant frequency, detect the occlusion based on the value of the electrical characteristic; and after the operation of the speaker based on the resonant frequency, determine that the occlusion has been ejected based on an updated value of the electrical characteristic. For example, the electronic device may determine that the updated value of the electrical characteristic satisfies the ejection termination threshold (e.g., the updated value is above or within a threshold range of an expected value, and/or is able to be fit to a model of the electrical characteristic).

As described above, one aspect of the present technology is the gathering and use of data available from specific and legitimate sources for providing user information in association with processing audio and/or non-audio signals. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for detecting an emergency condition and/or generating an emergency alert. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of detecting an emergency condition and/or generating an emergency alert, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 14:
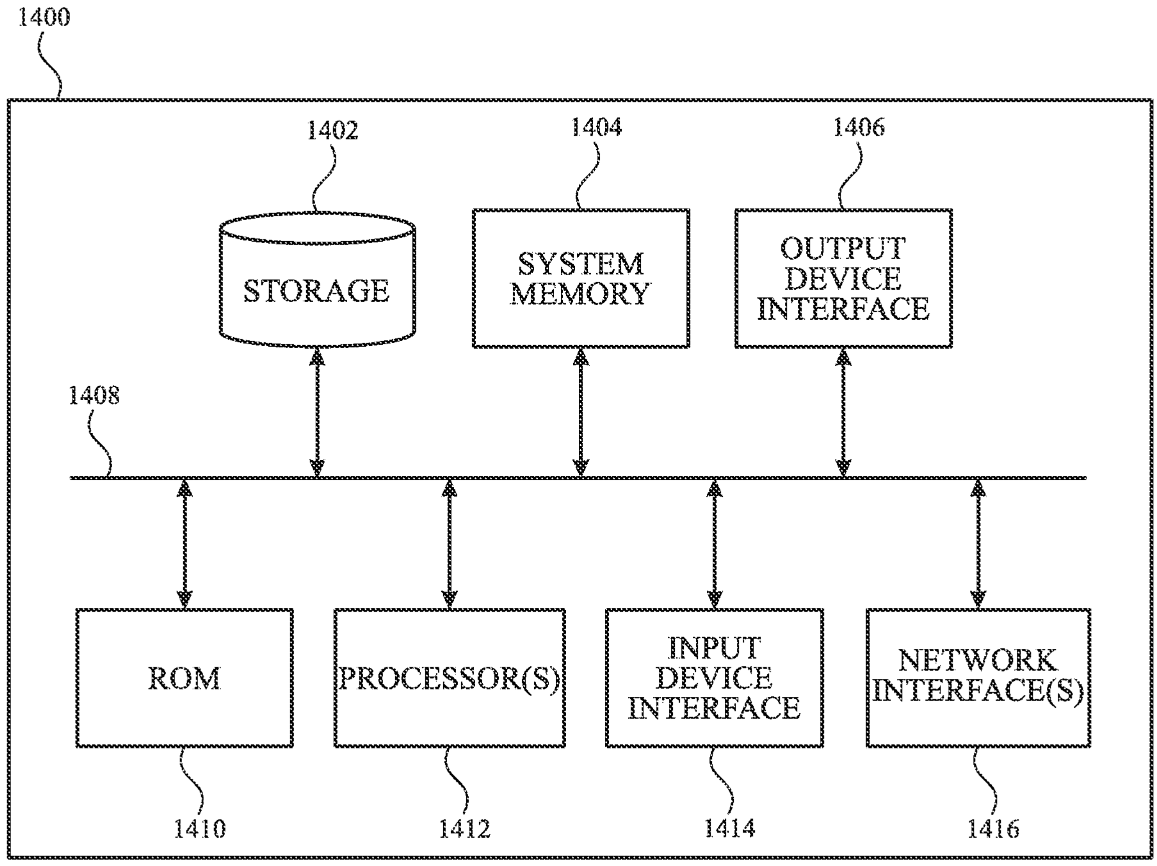
FIG. 14 illustrates an electronic system with which one or more implementations of the subject technology may be implemented.

FIG. 14 illustrates an electronic system 1400 with which one or more implementations of the subject technology may be implemented. The electronic system 1400 can be, and/or can be a part of, one or more of the electronic device 100 shown in FIG. 1. The electronic system 1400 may include various types of computer readable media and interfaces for various other types of computer readable media. The electronic system 1400 includes a bus 1408, one or more processing unit(s) 1412, a system memory 1404 (and/or buffer), a ROM 1410, a permanent storage device 1402, an input device interface 1414, an output device interface 1406, and one or more network interfaces 1416, or subsets and variations thereof.

The bus 1408 collectively represents all system, peripheral, and chipset buses that communicatively connect the numerous internal devices of the electronic system 1400. In one or more implementations, the bus 1408 communicatively connects the one or more processing unit(s) 1412 with the ROM 1410, the system memory 1404, and the permanent storage device 1402. From these various memory units, the one or more processing unit(s) 1412 retrieves instructions to execute and data to process in order to execute the processes of the subject disclosure. The one or more processing unit(s) 1412 can be a single processor or a multi-core processor in different implementations.

The ROM 1410 stores static data and instructions that are needed by the one or more processing unit(s) 1412 and other modules of the electronic system 1400. The permanent storage device 1402, on the other hand, may be a read-and-write memory device. The permanent storage device 1402 may be a non-volatile memory unit that stores instructions and data even when the electronic system 1400 is off. In one or more implementations, a mass-storage device (such as a magnetic or optical disk and its corresponding disk drive) may be used as the permanent storage device 1402.

In one or more implementations, a removable storage device (such as a floppy disk, flash drive, and its corresponding disk drive) may be used as the permanent storage device 1402. Like the permanent storage device 1402, the system memory 1404 may be a read-and-write memory device. However, unlike the permanent storage device 1402, the system memory 1404 may be a volatile read-and-write memory, such as random access memory. The system memory 1404 may store any of the instructions and data that one or more processing unit(s) 1412 may need at runtime. In one or more implementations, the processes of the subject disclosure are stored in the system memory 1404, the permanent storage device 1402, and/or the ROM 1410. From these various memory units, the one or more processing unit(s) 1412 retrieves instructions to execute and data to process in order to execute the processes of one or more implementations.

The bus 1408 also connects to the input and output device interfaces 1414 and 1406. The input device interface 1414 enables a user to communicate information and select commands to the electronic system 1400. Input devices that may be used with the input device interface 1414 may include, for example, microphones, alphanumeric keyboards and pointing devices (also called "cursor control devices"). The output device interface 1406 may enable, for example, the display of images generated by electronic system 1400. Output devices that may be used with the output device interface 1406 may include, for example, printers and display devices, such as a liquid crystal display (LCD), a light emitting diode (LED) display, an organic light emitting diode (OLED) display, a flexible display, a flat panel display, a solid state display, a projector, a speaker or speaker module, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 14, the bus 1408 also couples the electronic system 1400 to one or more networks and/or to one or more network nodes through the one or more network interface(s) 1416. In this manner, the electronic system 1400 can be a part of a network of computers (such as a LAN, a wide area network ("WAN"), or an Intranet, or a network of networks, such as the Internet. Any or all components of the electronic system 1400 can be used in conjunction with the subject disclosure.

In accordance with some aspects of the subject disclosure, a method is provided that includes obtaining an electrical characteristic of an electronic component of an electronic device during operation of the electronic component; determining, based on the electrical characteristic, a resonant frequency of a speaker of the electronic device; and generating an audio output with the speaker using the resonant frequency.

In accordance with other aspects of the subject disclosure, an electronic device is provided that includes a speaker; an electronic component; and one or more processors configured to: receive an emergency alert trigger; determine, responsive to the emergency alert trigger, a resonant frequency of the speaker based on an electrical characteristic of a component of the speaker; and generate, with the speaker, an emergency alert including audio content at the resonant frequency.

In accordance with other aspects of the subject disclosure, an electronic device is provided that includes a speaker; an electronic component; and one or more processors configured to: obtain an electrical characteristic of the electronic component during operation of the speaker; determine, based on the electrical characteristic, a resonant frequency of the speaker; and generate an audio output with the speaker using the resonant frequency.

In accordance with other aspects of the subject disclosure, an electronic device is provided that includes a speaker; and one or more processors configured to: determine, while the speaker is occluded by an occlusion, a resonant frequency of the speaker; and operate the speaker based on the resonant frequency to eject the occlusion.

In accordance with other aspects of the subject disclosure, a method is provided that includes determining, while a speaker is occluded by an occlusion, a resonant frequency of the speaker; and operating the speaker based on the resonant frequency to eject the occlusion.

In accordance with other aspects of the subject disclosure, a non-transitory, computer-readable medium is provided, storing instructions which, when executed by one or more processors, cause the one or more processors to: determine, while a speaker is occluded by an occlusion, a resonant frequency of the speaker; and operate the speaker based on the resonant frequency to eject the occlusion Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM.

The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method, comprising:

obtaining an electrical characteristic of an electronic component of an electronic device during operation of the electronic component;

determining, based on the electrical characteristic, a resonant frequency of a speaker of the electronic device; and generating an audio output with the speaker at the resonant frequency to provide an enhanced loudness of the audio output.

2. The method of claim 1, further comprising:

detecting, by the electronic device, an emergency condition, wherein generating the audio output comprises generating the audio output responsive to the detecting.

3. The method of claim 1, wherein the electrical characteristic comprises at least one of a voltage, a current, or an impedance.

4. The method of claim 1, wherein the electronic component comprises a component of the speaker.

5. The method of claim 4, wherein the component of the speaker comprises a voice coil of the speaker.

6. The method of claim 1, wherein generating the audio output comprises:

synthesizing, by the electronic device, audio content at the resonant frequency; and outputting the synthesized audio content with the speaker.

7. The method of claim 6, wherein synthesizing the audio content at the resonant frequency comprises synthesizing the audio content according to a coded recipe that defines a duration and a frequency of a tone, the frequency of the tone corresponding to a semitone bin corresponding to the resonant frequency.

8. The method of claim 1, wherein generating the audio output comprises:

obtaining an audio file stored at the electronic device;

shifting a pitch of audio content in the audio file based on the resonant frequency; and outputting, by the speaker, the audio content with the pitch shifted based on the resonant frequency.

9. The method of claim 1, further comprising:

detecting a change in the electrical characteristic while generating the audio output with the speaker;

determining an updated resonant frequency different from the resonant frequency based on the detected change in the electrical characteristic; and modifying the audio output based on the updated resonant frequency.

10. The method of claim 9, wherein:

determining the resonant frequency comprises determining a first resonant frequency and a second resonant frequency of the speaker; and generating the audio output comprises generating the audio output based on the first resonant frequency and the second resonant frequency.

11. The method of claim 10, wherein determining the updated resonant frequency different from the resonant frequency comprises determining a first change in the first resonant frequency and a second change in the second resonant frequency, the first change different from the second change, and wherein modifying the audio output based on the updated resonant frequency comprises modifying a first portion of the audio output based on the first change and modifying a second portion of the audio output based on the second change.

12. The method of claim 1, further comprising:

detecting, based on a change in the electrical characteristic, debris in a speaker port of the speaker; and operating the speaker to purge the debris.

13. The method of claim 1, wherein determining the resonant frequency of the speaker based on the electrical characteristic comprises adjusting a model based on the electrical characteristic and obtaining the resonant frequency from the adjusted model.

14. An electronic device, comprising:

a speaker having a resonant frequency that changes over time during operation of the speaker while the speaker is un-occluded;

an electronic component; and one or more processors configured to:

obtain an electrical characteristic of the electronic component during operation of the speaker while the speaker is un-occluded;

determine, based on the electrical characteristic, a resonant frequency of the speaker; and generate an audio output with the speaker at an output frequency that is different from the resonant frequency by an amount that is based on a frequency of a prior output tone from the speaker.

15. The electronic device of claim 14, further comprising an enclosure having a port for the speaker, wherein a sound-generating component of the speaker is offset from the port.

16. The electronic device of claim 15, wherein the port has an additional resonant frequency, and wherein the one or more processors are further configured to:

determine, based on the electrical characteristic, the additional resonant frequency of the port; and update the audio output with the speaker using the resonant frequency and the additional resonant frequency.

17. The electronic device of claim 15, wherein the electronic component comprises a voice coil of the speaker, and wherein the electrical characteristic comprises an impedance of the voice coil.

18. The electronic device of claim 17, wherein the one or more processors are further configured to:

detect a change in the electrical characteristic while generating the audio output with the speaker;

determine an updated resonant frequency different from the resonant frequency based on the detected change in the electrical characteristic; and modify the audio output based on the updated resonant frequency.

19. An electronic device, comprising:

a speaker;

an electronic component; and one or more processors configured to:

receive an emergency alert trigger;

determine, responsive to the emergency alert trigger, a resonant frequency of the speaker based on an electrical characteristic of a component of the speaker; and generate, with the speaker, an emergency alert including audio content at a frequency corresponding to a semitone bin corresponding to the resonant frequency.

20. The electronic device of claim 19, further comprising a sensor, wherein the emergency alert trigger comprises a sensor-based trigger based on a sensor signal from the sensor.

21. The electronic device of claim 19, wherein the emergency alert trigger comprises a user input.

* * * * *